United States Patent
Larsen et al.

(10) Patent No.: US 9,077,021 B2
(45) Date of Patent: Jul. 7, 2015

(54) REMOVAL OF IMPURITY PHASES FROM ELECTROCHEMICAL DEVICES

(75) Inventors: Peter Halvor Larsen, Roskilde (DK); Mogens Mogensen, Lynge (DK); Peter Vang Hendriksen, Hilleroed (DK); Søren Linderoth, Roskilde (DK); Ming Chen, Roskilde (DK)

(73) Assignee: Technical University of Denmark, Kgs. Lyngby (DK)

( * ) Notice: Subject to any disclaimer, the term of this patent is extended or adjusted under 35 U.S.C. 154(b) by 1024 days.

(21) Appl. No.: 12/674,943

(22) PCT Filed: Aug. 29, 2008

(86) PCT No.: PCT/EP2008/007097
§ 371 (c)(1),
(2), (4) Date: Apr. 1, 2011

(87) PCT Pub. No.: WO2009/027100
PCT Pub. Date: Mar. 5, 2009

(65) Prior Publication Data
US 2011/0198216 A1    Aug. 18, 2011

(30) Foreign Application Priority Data
Aug. 31, 2007   (EP) ..................... 07017097

(51) Int. Cl.
*H01M 4/90* (2006.01)
*H01M 8/06* (2006.01)
*H01M 8/12* (2006.01)
*H01M 4/86* (2006.01)
*H01M 4/88* (2006.01)

(52) U.S. Cl.
CPC .......... *H01M 8/1213* (2013.01); *H01M 4/8663* (2013.01); *H01M 4/8889* (2013.01); *H01M 2008/1293* (2013.01); *Y02E 60/521* (2013.01); *Y02E 60/525* (2013.01)

(58) Field of Classification Search
CPC .......... H01M 8/00; H01M 8/10; H01M 10/04
USPC .................... 204/242, 192, 193; 429/479, 495
See application file for complete search history.

(56) References Cited

U.S. PATENT DOCUMENTS

| | | | |
|---|---|---|---|
| 5,419,827 A | 5/1995 | Nanataki et al. | 204/421 |
| 6,099,985 A | 8/2000 | Elangovan et al. | 429/44 |

(Continued)

FOREIGN PATENT DOCUMENTS

| | | |
|---|---|---|
| JP | 2005-019261 A | 1/2005 |
| JP | 2008-502113 A | 1/2008 |

(Continued)

OTHER PUBLICATIONS

Lybye et al., "A study of complex effects of alumina addition on conductivity of stabilised zirconia," *Journal of the European Ceramic Society* 26:599-604, Aug. 22, 2006.

*Primary Examiner* — Zulmariam Mendez
(74) *Attorney, Agent, or Firm* — Seed IP Law Group PLLC

(57) ABSTRACT

The present invention provides a solid oxide cell comprising a support layer, a first electrode layer, an electrolyte layer, and a second cathode layer, wherein at least one of the electrode layers comprises electrolyte material, a catalyst and agglomerated particles selected from the group consisting of alkali oxides, earth alkali oxides and transition metal oxides.

5 Claims, 8 Drawing Sheets

(56) References Cited

U.S. PATENT DOCUMENTS

| | | | |
|---|---|---|---|
| 6,544,665 B2 | 4/2003 | Rigney et al. | |
| 7,485,385 B2* | 2/2009 | Seccombe et al. | 429/469 |
| 7,601,183 B2 | 10/2009 | Larsen | |
| 2003/0052392 A1 | 3/2003 | Amiotti | |
| 2004/0131919 A1* | 7/2004 | Yasumoto et al. | 429/42 |
| 2004/0166380 A1 | 8/2004 | Gorte et al. | 429/12 |
| 2004/0202918 A1* | 10/2004 | Mardilovich et al. | 429/40 |
| 2005/0214616 A1 | 9/2005 | Kumar et al. | 429/33 |
| 2006/0083970 A1* | 4/2006 | Shibutani et al. | 429/30 |
| 2008/0003487 A1* | 1/2008 | Takizawa | 429/46 |
| 2008/0118635 A1* | 5/2008 | Larsen | 427/115 |
| 2008/0124598 A1 | 5/2008 | Backhaus-Ricoult et al. | |
| 2009/0017356 A1* | 1/2009 | Hojo et al. | 429/30 |

FOREIGN PATENT DOCUMENTS

| | | |
|---|---|---|
| JP | 2010-511282 A | 4/2010 |
| WO | WO 2005/122300 A2 | 12/2005 |

* cited by examiner

FIG. 3C
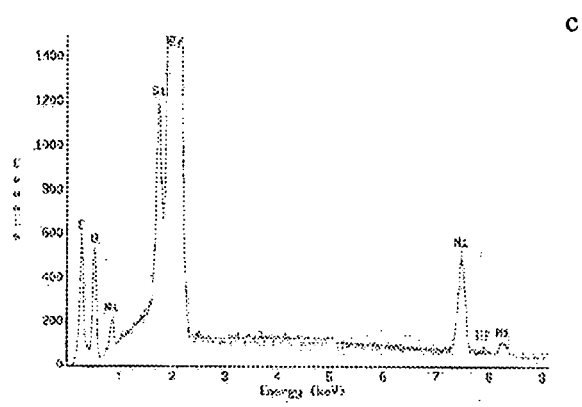
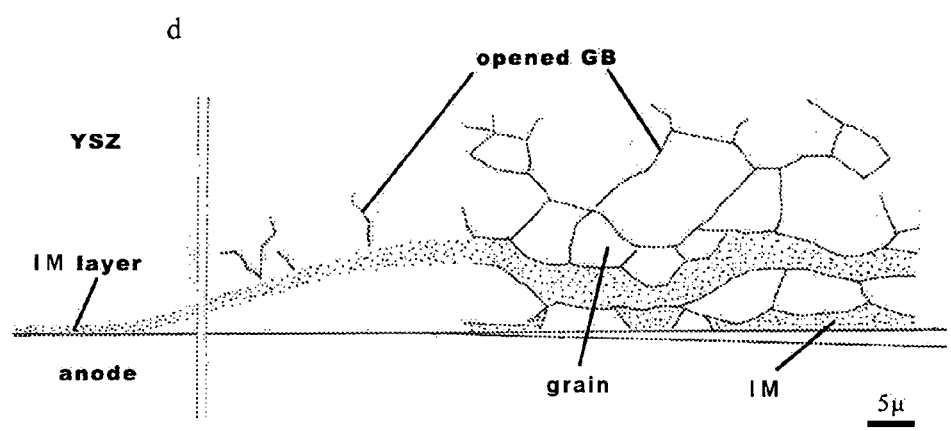
FIG. 3D

REMOVAL OF IMPURITY PHASES FROM ELECTROCHEMICAL DEVICES

FIELD OF THE INVENTION

The present invention relates to a novel method of mobilization and removal of impurities from grain boundaries and reactive electrode sites (three phase boundaries) in solid state electrochemical devices, and further relates to such a device. The invention is particularly suitable for use in solid oxide cells (SOC's), electrochemical flue gas purification cells and membranes for oxygen or hydrogen separation.

The invention moreover specifically relates to an advanced getter system that, during sintering of the component, attracts and bonds undesired impurities present in the raw materials. Furthermore, the invention relates to a method of activating and mobilizing the aforementioned impurity phases so as to enhance the diffusion of impurity phases from grain boundaries and reactive electrode sites to the getter areas.

BACKGROUND OF THE INVENTION

Solid oxide cells (SOC's) as an example of an electrochemical device generally include cells designed for different applications, such as solid oxide fuel cells (SOFC's), solid oxide electrolysis cells (SOEC's), or membranes. Due to their common basic structure, the same cell may be designed so as to be used in SOFC applications as well as SOEC applications. Since in SOFC's fuel is fed into the cell and converted into power, while in SOEC's power is applied to produce fuel, these cells are referred to as 'reversible'.

Solid oxide fuel cells (SOFC's) are well known in the art and come in various designs. Typical configurations include an electrolyte layer being sandwiched between two electrodes. During operation, usually at temperatures of about 500° C. to about 1100° C., one electrode is in contact with oxygen or air, while the other electrode is in contact with a fuel gas. Furthermore, a support layer is usually used during the production of the cell to host an electrode layer thereof, whereby said support provides additional mechanical stability of the cell and may also function as, for example, a current collector.

An anode supported cell and a general operational principle in an SOFC mode is shown in FIG. 1. At the cathode, usually comprising lanthanum/strontium manganate (LSM) and yttria stabilized zirconia (YSZ), oxygen ions are formed from the provided oxygen gas, which migrate through the electrolyte layer to combine with the provided hydrogen gas at the anode which comprises YSZ and Ni so as to form water and electrons. The electrons are collected in the anode current collector, which is in FIG. 1 exemplified as a combination of a support for mechanical stability and a current collector, forming a thicker layer.

In advanced electrocatalytic systems, as found in SOC's, the surface chemistry plays a significant role during operation, and the presence of impurities/additives on the respective surfaces has a major influence on the performance and durability of the device.

The manufacture processes for such electrocatalytic systems up to date generally comprise the use of "pure" starting materials so as to avoid any unwanted incorporation of impurities which deteriorate the later performance of the device. "Pure" starting materials are usually commercially available materials having a purity as high as about 99.9%. However, although said starting materials are considered to have a high degree of purity, for purposes of starting materials being used in SOC's they still contain a considerable amount of impurities which deteriorate the later performance of the device especially when present at grain boundaries and reactive electrode sites even at said purity levels of the starting materials.

On a positive side, the presence of said impurities, such as $SiO_2$, $Al_2O_3$, alkali- and alkaline earth oxides, and the like, in the oxide starting materials advantageously assist the sintering process by providing a liquid phase. In the finally obtained devices, said the impurities are often found in the form of ultra thin glass films on surfaces, in grain boundaries or at interfaces of the components in the system. The deliberate addition of various sintering aids during the manufacture will also affect the properties of the glass phase. The glass phase may be amorphous, crystalline or a combination thereof.

However, the presence of such impurity phases can result in a decrease in conductivity due to the location in the grain boundaries (GB), a decrease in the catalytic activity due to blocking of the three phase boundaries (TPB) and a delamination of the device due to weakening of the interface, thermal stresses and possible phase changes during operation.

Furthermore, during the manufacture of a solid oxide cell, various additives as an additional source of such impurities may be added intentionally, for example in form of sintering additives. While these sintering additives are improving the layer formation during the manufacture process, it was found that the presence of these additives may nevertheless disadvantageously result in a deteriorated performance of the cell.

Thus, while various additives may be advantageous for improving the manufacturing processes of the cells, they may at the same time disadvantageously represent another source for impurities which may diffuse to grain boundaries and reactive electrode sites during operation and deteriorate the overall cell performance.

US2003/0052392 A1 relates to a device comprising a base which includes a contaminant removing material in form of discrete deposits, which are configured so as to be at least partially exposed to the atmospheric environment of the device. The contaminant removing material is preferably selected from the group consisting of Zr, Ti, Nb, Ta, V and alloys of these metals, and which may further contain Cr, Mn, Fe Co, Ni, Al, Y, La and rare-earth.

U.S. Pat. No. 6,544,665 discloses a thermal barrier coating comprising small amounts of alumina precipitates dispersed throughout the grain boundaries and pores of the coating to oxide getter impurities which would otherwise allow or promote grain sintering and coarsening and pore coarsening.

WO-A-2005/122300 discloses a SOFC cell comprising a metallic support material; an active anode layer consisting of a good hydrocarbon cracking catalyst; an electrolyte layer; an active cathode layer; and a transition layer consisting of preferably a mixture of LSM and a ferrite to the cathode current collector, with means being provided for preventing diffusion between the metallic support and the active anode.

U.S. Pat. No. 6,099,985 discloses a process for precluding coarsening of particles of a first metal in an anode, for use in a solid oxide fuel cell, comprising the steps of:
  forming an electrolyte substrate;
  preparing a liquid precursor, for a solid solution anode layer containing a first metal and a metal oxide in an amount relative to the first metal effective to substantially preclude coarsening of particles of the first metal in the anode layer, when in use in a solid oxide fuel cell;
  decomposing the liquid precursor to form a solid solution containing the first metal and the metal oxide in an amount relative to the first metal effective to substantially preclude coarsening of particles of the first metal in the anode layer, when in use in a solid oxide fuel cell;

converting the solid solution to an anode layer powder;
converting the anode layer powder to an anode suspension material:
placing the anode suspension material onto the electrolyte substrate; and
curing the anode suspension material to form an anode layer disposed upon the electrolyte substrate.

US-A-2005/0214616 relates to a ceramic-ceramic nanocomposite electrolyte having a heterogeneous structure comprising chemically stabilized zirconia and a nanosize ceramic dopant material selected from $Al_2O_3$, $TiO_2$, MgO, BN, and $Si_3N_4$.

U.S. Pat. No. 5,419,827 discloses a sintered zirconia ceramic, consisting essentially of:
(a) grains of partially stabilized zirconia consisting essentially of:
(i) 1.5-7.0% by mole of a stabilizer, wherein more than 70% by mole of said stabilizer is yttrium oxide, and
(ii) as the reminder, zirconium oxide and unavoidable impurities; and
(b) grain boundaries including a glass phase containing:
(i) 0.01-2% by weight of MgO based on the sum of said zirconium oxide and said stabilizer;
(ii) 0.1-30% by weight of $Al_2O_3$ based on the sum of said zirconium oxide and said stabilizer; and
(iii) 0.3-3% by weight of $SiO_2$ based on the sum of said zirconium and said stabilizer, wherein a critical temperature difference of said sintered zirconia ceramic is larger than or equal to 340° C.

US-A-2004/0166380 discloses a cathode comprising a porous ceramic matrix, and at least an electronically conducting material dispersed at least partially within the pores of the porous ceramic matrix, wherein the porous ceramic matrix includes a plurality of pores having an average pore size of at least about 0.5 μm.

In view of the above, there is a desire to reduce the amount of impurities at the grain boundaries and reactive electrode sites in order to improve the overall performance of the device.

OBJECT OF THE INVENTION

It was the object of the present invention to provide a solid oxide cell having an improved performance and prolonged life time, and a process for producing same.

BRIEF DESCRIPTION OF THE INVENTION

The present invention provides a solid oxide cell comprising a support layer, a first electrode layer, an electrolyte layer; and a second electrode layer, wherein at least one of the electrode layers comprises electrolyte material, a catalyst and agglomerated particles selected from the group consisting of alkali oxides, earth alkali oxides and transition metal oxides.

The present invention further provides a solid oxide cell comprising a support layer, an anode layer, an electrolyte layer, and a cathode layer,
wherein the cell further comprises an impurity sink layer between the support layer and the anode layer and/or on top of the cathode layer, and wherein the impurity sink layer comprises agglomerated particles selected from the group consisting of alkali oxides, earth alkali oxides and transition metal oxides.

The present invention moreover provides a method for producing the above solid oxide cell, comprising the steps of:
providing a support layer;
applying a first electrode layer on the support layer;
applying an electrolyte layer on top of said electrode layer;
applying a second electrode layer on top of said electrolyte layer;
sintering the obtained structure,
wherein at least one of the first and second electrode layer comprises agglomerated particles selected from the group consisting of alkali oxides, earth alkali oxides and transition metal oxides.

The present invention moreover provides a method for producing the above solid oxide cell, comprising the steps of:
providing a support layer;
optionally applying an impurity sink layer on the support layer;
applying a first electrode layer on either the support layer or impurity sink layer;
applying an electrolyte layer on top of said first electrode layer;
applying a second electrode layer on top of said electrolyte layer,
optionally applying an impurity sink layer on top of said second electrode layer and
sintering the obtained structure,
wherein the produced cell comprises at least one impurity sink layer, and wherein said impurity sink layer comprises electrolyte material, a catalyst and comprises agglomerated particles selected from the group consisting of alkali oxides, earth alkali oxides and transition metal oxides.

Preferred embodiments are set forth in the subclaims.

BRIEF DESCRIPTION OF THE DRAWINGS

FIG. 3c is a XRD of the material illustrated in FIGS. 3a and 3b.

FIG. 3d is a sketch of the distribution of impurities near the electrode-electrolyte interface after 600 h testing. GB denotes grain boundaries.

DESCRIPTION OF THE INVENTION

Figure 1:
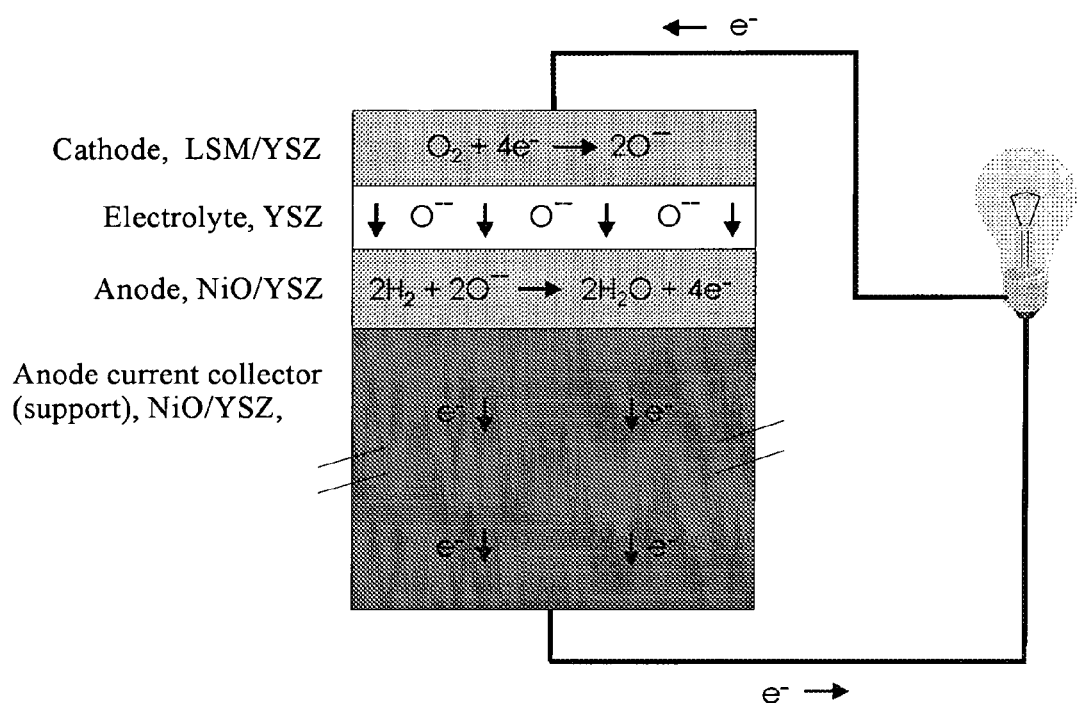
FIG. 1 illustrates a standard anode supported cell and the operational principle in SOFC mode.

The present invention relates to a solid oxide cell comprising a support layer, an anode layer, an electrolyte layer; and a cathode layer,
wherein at least one of the anode layer and the cathode layer comprises electrolyte material, a catalyst and agglomerated particles selected from the group consisting of alkali oxides, earth alkali oxides and transition metal oxides.

Advantageously, the solid oxide cell comprises agglomerated particles forming an advanced getter system that, during the sintering step of the component and/or during cell stack operation, attracts and bonds any undesired impurities. The "getter system" or "getter particles" as used herein refer to the agglomerated particles comprised in the SOC. Said agglomerated particles function as impurity attracting species and thus concentrate impurities at the location of said agglomerated particles instead of, for example, at grain boundaries, thereby functioning as "getter" particles for any impurities.

Furthermore, any impurity phases on the surfaces are advantageously mobilized so as to enhance the diffusion of impurity phases from grain boundaries and reactive electrode sites to said getter particles, i.e. the areas where the agglomerated particles are located, where the impurities are bonded and immobilized.

Table 1 summarizes typical impurities and the amounts in which they are usually contained in starting materials YSZ, NiO and LSM as examples of typical materials forming the electrodes.

It is strongly advantageous to make scavenger agglomerate with a nanosized porosity as this will provide capillary forces that will attract the mobilized impurities.

TABLE 1

Typical impurities and concentrations in materials for SOCs

| Element | Impurity concentration (ppm wt) in | | |
|---|---|---|---|
| | YSZ | NiO | LSM |
| Li | 0.1-3 | <0.05 | 0.18-1.6 |
| Na | 200-1000 | <1 | 10-35 |
| Mg | 0.4-5 | <0.5 | 1.5-10 |
| Al | 1.7-15 | ~3.4 | 3-25 |
| Si | 10-20 | 12 | 5-15 |
| K | 0.25-3.1 | <1 | 1-20 |
| Ca | 0.75-11 | ~1.6 | 800-2000 |
| Ti | 2-12 | <0.5 | 0.8-3 |
| Cr | 0.2-4 | ~10 | 20-180 |
| Fe | 5-50 | ~23 | 35-430 |
| Co | <0.5 | <0.5 | 3.5-40 |
| Cu | 0.75-5 | ~1.2 | 4.5-20 |
| Zn | 0.5-2.5 | ~5.5 | |
| Mo | <0.5 | | |
| Sn | <0.5 | | |
| Ba | 0-2 | | 3-1300 |
| Pb | 0-2.3 | <0.05 | 0.2-3 |

Anode supported SOFC's are typically manufactured by co-sintering of the NiO—YSZ anode support (AS) together with the electrochemically active NiO—YSZ anode (A) and an YSZ electrolyte (E). The multilayer structure as shown FIG. 2 can be made by, for example, tape-casting of the anode support layer, followed by deposition of the A and E layer by, for example, spray painting. The cathode (not shown in FIG. 2) may also be deposited by spray painting, as discussed in Christiansen, N.; Kristensen, S.; Holm-Larsen, H.; Larsen, P. H.; Mogensen, M.; Hendriksen, P. V.; Linderoth, S., Status of the SOFC development at Haldor Topsøe/Risø. In: Proceedings. 8. International symposium on solid oxide fuel cells (SOFC VIII); Electrochemical Society 203; Meeting, Paris (FR), 27 Apr.-2 May 2003. Singhal, S. C.; Dokiya, M. (eds.), (Electrochemical Society, Pennington, N.J., 2003) p. 105-112.

Figures 2A, 2B:
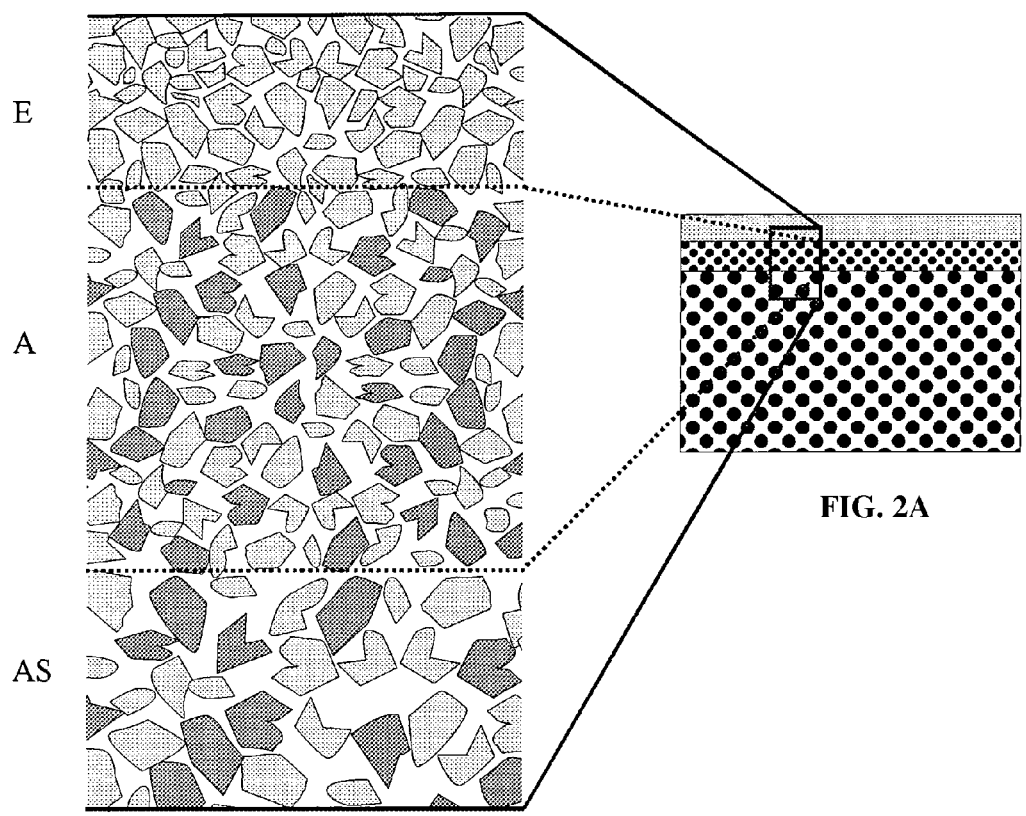
FIGS. 2A and 2B illustrates a schematic green structure of a multilayer component suitable for use in SOCs, comprising an anode support (AS), an anode (A), and an electrolyte (E).

The exploded part, FIG. 2B, illustrates the NiO particles (dark) and YSZ particles (light) in the various layers in the green state, i.e. prior to sintering. During the sintering process, impurities contained in the raw materials advantageously assist the grain growth and pore elimination by providing a liquid phase that increases the diffusion rate of the elements in the respective layers. The sintering process may further be enhanced by addition of sintering additives, e.g. transition metal oxides. It should be noted that an initial layer of impurities will almost always be present on the surface of the particles, and in addition impurities will segregate to the surface during the sintering step.

Impurities may also be introduced during operation or other handling of the device because the solubility in the component materials and in the glass phase varies with temperature. Impurities will also be introduced at the interfaces due to the components of the gases (air, fuel etc.) involved in the operation of the system. Impurities may further be transported in the gas phase from other components of the system, e.g. from the interconnect connecting the cells.

The green microstructure illustrated in FIG. 2B is tailored so that the electrolyte during sintering densifies to preferably more than 96% of the theoretical density to ensure gas tightness, whereas the anode and anode support layers will have a porosity in the order of preferably 15-20% after sintering (after reduction of the NiO to Ni, the porosity will typically be in the range of 30-40%). Some of the impurities in the electrolyte will, during grain growth and pore elimination, diffuse to the surfaces along the grain boundaries (GB).

Figure 3A:
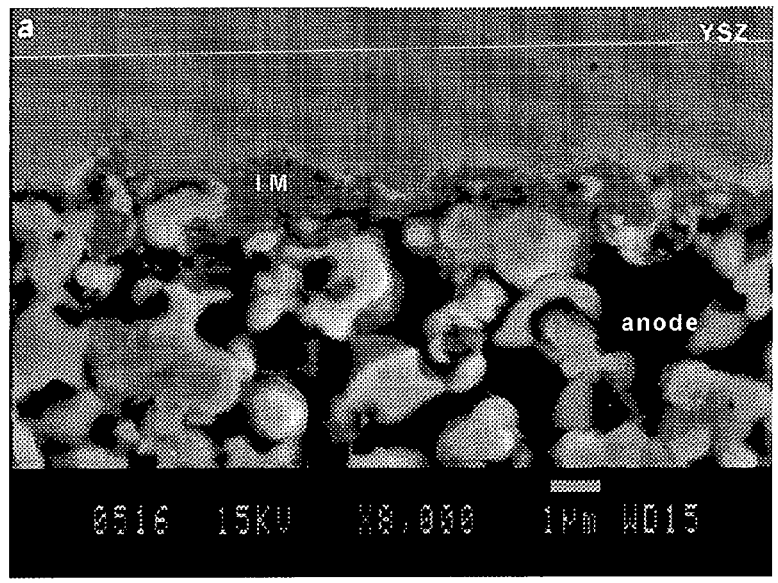
FIGS. 3a and 3b are SEM micrographs of a Ni—YSZ anode containing silica impurities. IM denotes the impurity phase.
Figure 3B:
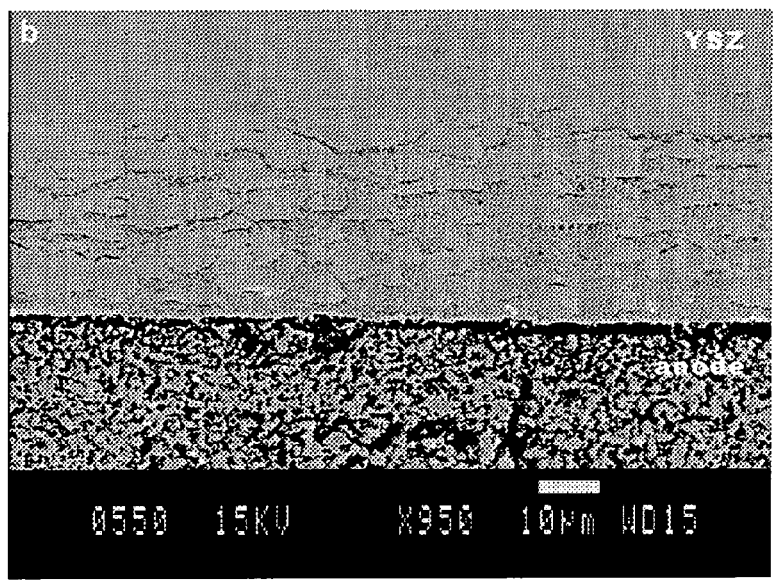

On the anode side, these impurities will combine with impurities from the anode, and to some extend block the reactive sites as illustrated in FIGS. 3a) and 3b) SEM micrographs of an SOFC Ni—YSZ anode containing silica-impurities. The EDS of FIG. 3c) shows that at least parts of the impurities are Si-containing. FIG. 3d) is a sketch of the distribution of impurities (IM) near the electrode-electrolyte interface after 600 h testing (see, for example, Liu et al., Solid state ionics, 161, (2003).

From FIG. 3a it is evident that access of fuel gas to the three phase boundary areas (TPB) is restricted due to the impurities, and this will inevitably cause a significant limitation in the electrochemical performance of the anode. The situation is similar at the cathode side. As realized by the present invention, removal of the impurity phases will consequently enhance the electrical performance of such components. It is advantageous to not only remove impurities from the TPB, but also from the grain boundaries to increase the ionic conductivity, as achieved in the present invention.

Ideally, the impurities (along with the deliberately added sintering aids) assist the sintering initially and are then subsequently removed from the critical areas where they could cause a decrease of device performance (i.e., the GB and TPB). Thus, the preparation of the device as known in the prior art is not negatively influenced since additives such as sintering aids may be used without further limitations. However, the lifetime of the device is greatly improved as these additives, disadvantageously representing impurities lowering the device performance, are neutralized.

In a preferred embodiment, the particles attracting the impurities comprise an oxide being selected from the group consisting of $Al_2O_3$, MgO, CaO, $CaZrO_3$, $SrZrO_3$, $BaZrO_3$, and mixtures thereof. Said particles are furthermore preferably agglomerated mesoporous particles. Alternatively, the particles can form nonporous agglomerated particles.

It is further preferred that in the solid oxide cell of the present invention, the electrolyte material is selected from the group consisting of doped zirconia, doped ceria, doped gallates and proton conducting electrolytes.

In another embodiment, the present invention relates to a solid oxide cell comprising a support layer, an anode layer, an electrolyte layer, and a cathode layer, wherein the cell further comprises an impurity sink layer between the support layer and the anode layer and/or on top of the cathode layer, and wherein the impurity sink layer comprises agglomerated particles selected from the group consisting of alkali oxides, earth alkali oxides and transition metal oxides.

Preferably, the particles in the impurity sink layer comprise an oxide being selected from the group consisting of $Al_2O_3$, MgO, CaO, $CaZrO_3$, $SrZrO_3$, $BaZrO_3$, and mixtures thereof. It is also preferred that the impurity sink layer comprises an electrolyte material being selected from the group consisting of doped zirconia, doped ceria, doped gallates and proton conducting electrolytes.

The agglomerated particles are preferably present in an amount of from 1 to 50 vol %, more preferably of from 5 to 30 vol %, and most preferably of from 10 to 20 vol %, based on the total volume of the respective composition forming the layer.

Figure 4:
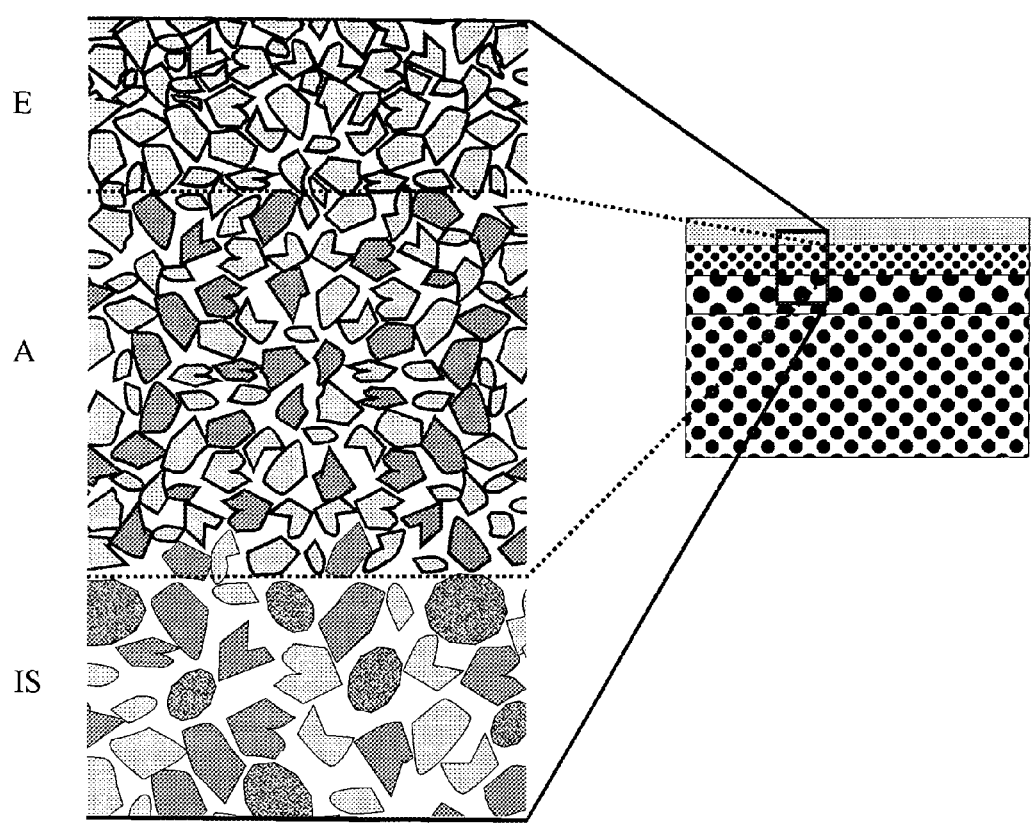
FIG. 4 illustrates a green structure of an embodiment of the present invention, comprising an impurity sink layer (IS), an anode (A), and an electrolyte (E).

The principle of the invention is further illustrated in FIG. 4 which shows a schematic figure of the green structure of said embodiment of the present invention. The multilayer component consists of an anode support (not shown in the exploded part), an impurity sink layer (IS), an anode (A) and an electrolyte (E). The impurity sink layer (IS) consists of three phases NiO (shown as dark grey), YSZ (light grey) and agglomerated particles (shaded) which will attract the impurity phases by capillary action as well as by its chemical affinity towards the impurity phases (i.e. the particles act as a $\Delta G$ sink).

The particles in the anode layer (A) are preferably coated with a fluxing agent that mobilizes the impurity phases, which may moreover preferably be the case for the electrolyte layer (E). The coating may preferably additionally include a sintering agent. Depending on the inherent mobility of the impurity phases, the above mentioned fluxing agent (illustrated in FIG. 4 by a thick black line around the particles) may be omitted. During the sintering process the impurity phases will diffuse to the getter particles where they will react and form stable phases.

Suitable materials as the above mobilizers include alkali-, earth alkali oxides, transition metal oxides and/or $B_2O_3$. These materials may be added in the form of binary oxides but other forms may also be relevant, e.g. $SrCO_3$. More preferred are $Na_2O$, $K_2O$, $MnO_x$, $VO_x$. The additions may be made using metal salts like $KNO_3$ or $NaCH_3CO_2$.

The agglomerated particles may be present either in layers (as illustrated in FIG. 4) or as discrete particles in the electrode and/or support layer. The agglomerated particles may also substitute partially or totally doped zirconia particles present in the support layer(s). Suitable materials generally include compositions that will form crystalline phases in the reaction with the impurity elements having a lower Gibbs energy of formation than the impurity phases alone.

As evident from Table 1 above, one of the most prominent impurities contained in the materials used for SOC's is $SiO_2$. The following compounds are preferred agglomerated particles suitable as getter materials for $SiO_2$: $Al_2O_3$, alkaline-earth oxides (MgO, CaO), alkaline-earth zirconates ($CaZrO_3$, $SrZrO_3$, and $BaZrO_3$), and Mg- and Ca-doped zirconia. Table 2 summarizes suitable $SiO_2$ getter materials and the resulting reaction products.

TABLE 2

Reaction products between different $SiO_2$-getter materials and the SOC anode containing NiO, $ZrO_2$, and $SiO_2$ (0.01 wt. %) at 1200° C.

| $SiO_2$-getter | Reaction product |
| --- | --- |
| MgO | $Mg_2SiO_4$ |
| CaO | $Ca_3Si_2O_7$, $CaSiO_3$ |
| $Al_2O_3$ + MgO | $Mg_2SiO_4$, $Mg_2Al_4Si_5O_{18}$, |
| $Al_2O_3$ + CaO | $Ca_3Si_2O_7$, $CaSiO_3$, $CaAl_2Si_2O_8$, $Ca_2Al_2SiO_7$, |
| $CaZrO_3$ | $Ca_3Si_2O_7$, $CaSiO_3$ |
| $SrZrO_3$ | $SrSiO_3$, $Sr_2SiO_4$, $Sr_3SiO_5$ |
| $BaZrO_3$ | $BaSiO_3$, $Ba_2SiO_4$ |

The agglomerated particles are preferably mesoporous particles. Also preferred are particles having a particle size in the range of 0.5 to 10 μm, and having an average pore diameter between 10 nm and 0.5 μm. These particles may for example be manufactured by agglomeration of fine powders in suspensions, followed by separation by centrifuging.

Filler materials, such as graphite, charcoal, natural starch or PMMA spheres, may also be included in the suspensions prior to agglomeration. An alternative manufacturing method is spray drying of suspensions. The powders are heat treated after the separation to remove any organics and to consolidate the meso- or nanostructure of the particles prior to the incorporation of the agglomerated particles into the electrochemical devices.

Figure 6:
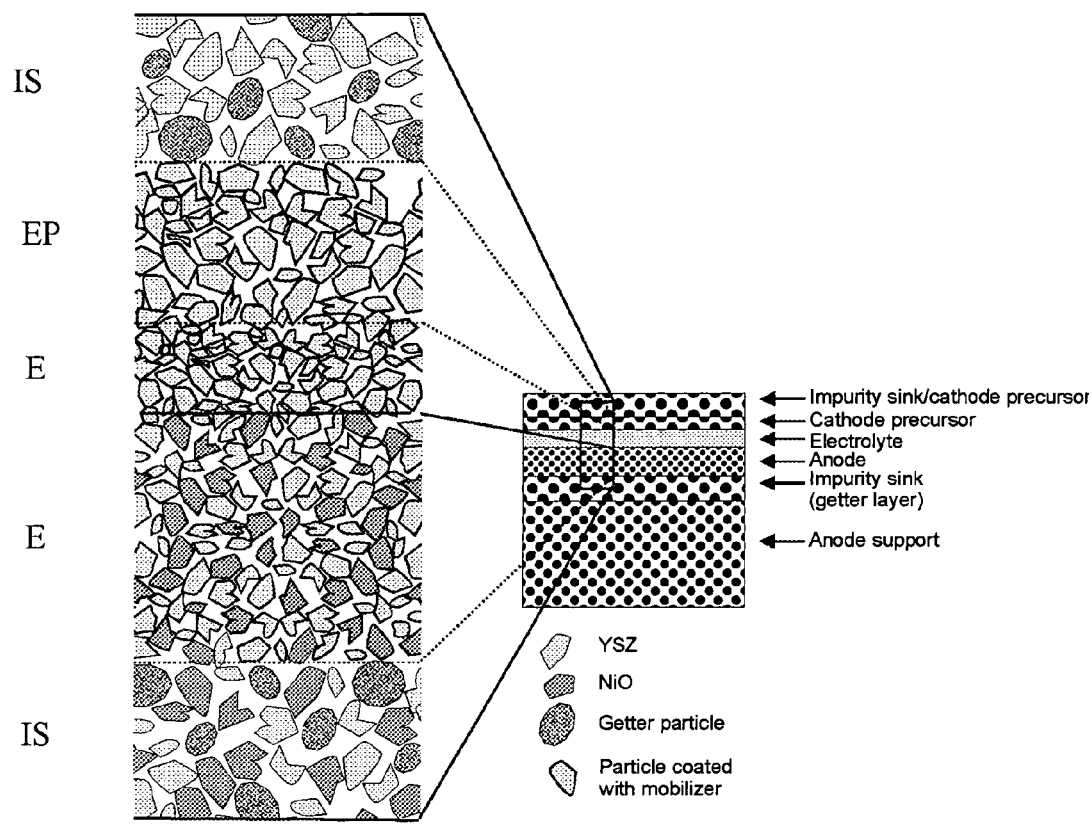
FIG. 6 illustrates a multilayer structure having impurity sinks on the cathode and anode site, comprising a cathode impurity sink layer (CIS), a cathode precursor layer (CP), an electrolyte layer (E), an anode (A), and an anode impurity sink layer (AIS).

In FIG. 6, a solid oxide cell is illustrated comprising an impurity sink layer (IS) on the anode side (A) and the cathode side (illustrated as a cathode precursor CP in FIG. 6). The impurity sink layer on the cathode side also acts as a cathode precursor layer after sintering into which a cathode electrocatalyst is impregnated.

Figure 7:
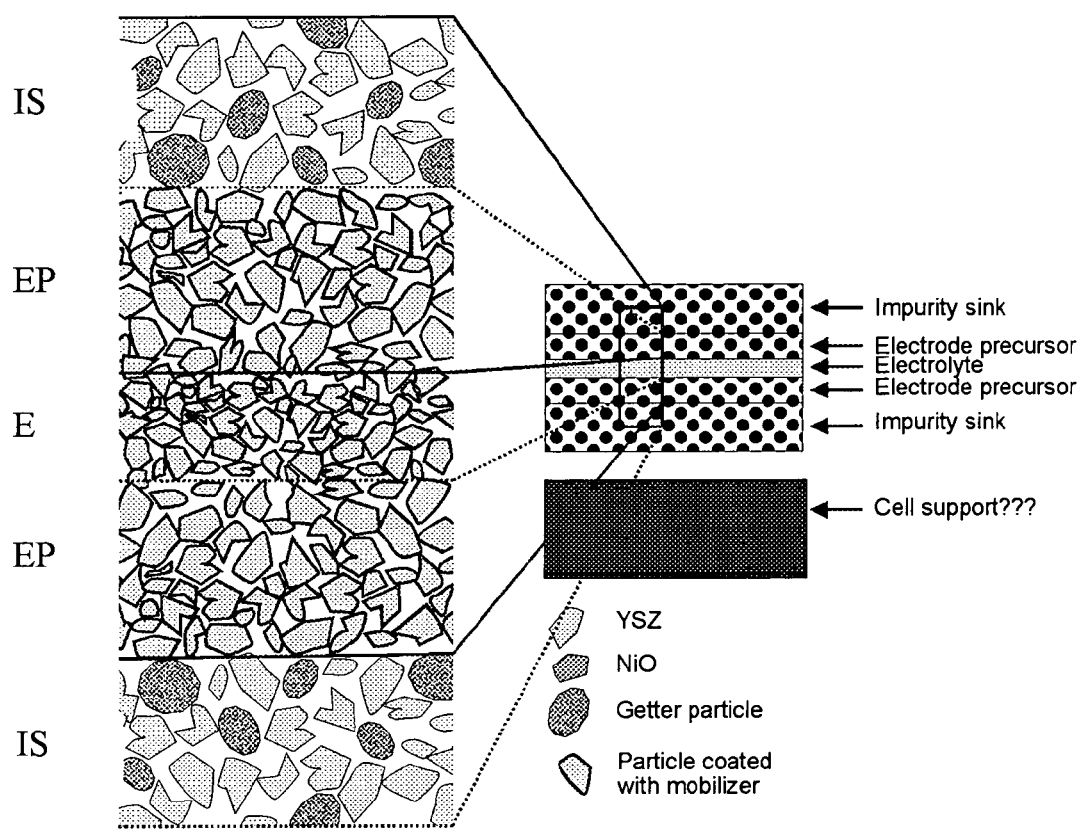
FIG. 7 illustrates a structure of a SOC in accordance with another embodiment of the present invention, comprising impurity sink layery (IS), electrode precursors (EP), and an electrolyte (E).

In FIG. 7, a symmetrical cell is illustrated in which mobilizers are added to both electrode precursor layers as well as to the electrolyte. Getter particles are added to the impurity sink layers on both sides of the cell, as is illustrated with the black lines around the coated particles.

Depending on the requirements and thickness of each layer, the illustrated cell may be a self supported cell, or may comprise a support (not shown in FIG. 7) on either side, for example a Ni/YSZ support or a metal support.

The present invention further relates to a method for producing the above solid oxide cell, comprising the steps of:
  providing a support layer;
  applying a first electrode layer on the support layer;
  applying an electrolyte layer on top of said first electrode layer,
  applying a second electrode layer on top of said electrolyte layer;
  sintering the obtained structure,
wherein at least one of the first and second electrode layer comprises agglomerated particles selected from the group consisting of alkali oxides, earth alkali oxides and transition metal oxides.

Moreover, in case the solid oxide cell comprises an impurity sink layer as described above, the present invention provides a method for producing a solid oxide cell comprising the steps of:
  providing a support layer;
  optionally applying an impurity sink layer on the support layer;
  applying a first electrode layer on either the support layer or impurity sink layer;
  applying an electrolyte layer on top of said first electrode layer;

applying a second electrode layer on top of said electrolyte layer;

optionally applying an impurity sink layer on top of said second electrode layer and sintering the obtained structure, wherein the produced cell comprises at least one impurity sink layer, and wherein said impurity sink layer comprises electrolyte material, a catalyst and comprises agglomerated particles selected from the group consisting of alkali oxides, earth alkali oxides and transition metal oxides.

Preferably, the first electrode is an anode and the second electrode is a cathode. Also preferred is the first electrode being a cathode and the second electrode being an anode.

Tailoring of the impurity phase properties is preferably attained by the use of a) suitable additives and/or b) by modification of the atmosphere. This results in an enhanced mobility due to a low viscosity and surface tension as well as an increased chemical affinity of the impurity phase towards special getter structures which constitute a minority volume part of the electrode or support layer. The undesired impurity phases will to a large extend accumulate in this getter structures where they will react and bond chemically. The materials used as agglomerated particles have a strong affinity towards the elements present in the impurity phases. Preferably, the particles are nanoporous particles/agglomerates in order to also facilitate absorption of the glass by capillary action.

A preferred way of atmosphere control is the mobilization and removal of impurities during heat treatment in atmospheres with high $H_2O$ concentration by the formation of volatile hydroxide phases. Preferably, the atmosphere during the sintering step has a relative humidity of at least 30%, more preferably at least 50%, and even more preferably at least 60%.

The sintering step is preferably carried out at temperatures of from 900 to 1300° C.

Advantageously, the solid oxide cell of the present invention has a prolonged lifetime and increased performance due to a novel getter system removing impurities from the electrochemically active sites of the cell.

The method of the present invention advantageously results in the mobilization and removal of impurities from grain boundaries and reactive electrode sites (three phase boundaries) in solid state electrochemical devices in a simple and very efficient way, making the process more cost effective while allowing for an improved SOC as compared to the SOC's of the prior art.

The multilayer structures of the present invention are particularly suitable for use in solid oxide cells (SOC's), electrochemical flue gas purification cells and membranes for oxygen or hydrogen separation.

The present invention will now be illustrated by specific examples. It is however not intended to limit the invention thereto.

EXAMPLES

Example 1

No Mobilization Agent Added

Figure 5:
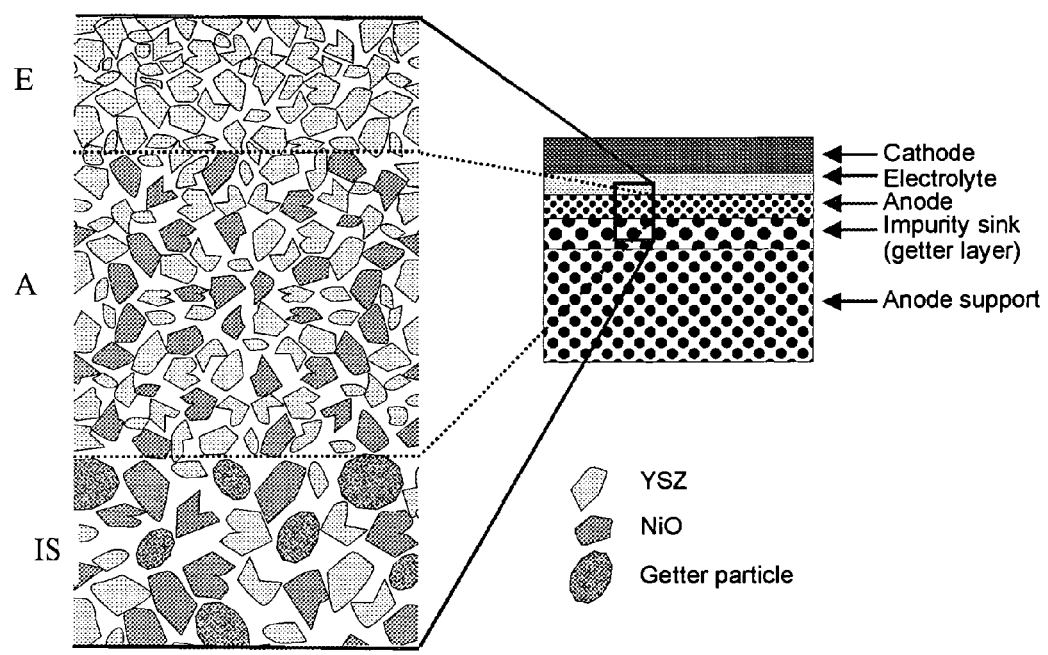
FIG. 5 illustrates the green microstructure of the multilayer structure as obtained in example 1, comprising an electrolyte layer (E), an anode (A), and an anode support to layer (AS).

A solid oxide fuel cell with an impurity sink layer between the anode and the anode support was formed. This multilayer structure is illustrated in FIG. 5.

The first step was the manufacture of four tapes: an anode support tape (AS), an impurity sink tape (IS), an anode tape (A) and an electrolyte tape (E). Suspensions for tape-casting were manufactured by means of ball milling of powders with polyvinyl pyrrolidone (PVP), polyvinyl butyral (PVB) and EtOH+MEK as additives. The suspensions were tape-cast using a double doctor blade system, and the tapes were subsequently dried.

AS-layer. The suspension comprised 45 vol % yttria stabilised zirconia (YSZ) and about 55 vol % NiO powder. The green thickness of the tape-cast layer was in the range of 400 μm. The porosity of this layer was in the range of 30% after sintering and reduction.

IS-layer. The suspension comprised 20 vol % porous $SrZrO_3$ particles (the mean particle size was around 4 micrometer with an average pore size of 70 nm), 25 vol % yttria stabilized zirconia (YSZ) and about 55 vol % NiO powder. The green thickness of the tape-cast layer was in the range of 25 μm. The porosity of this layer was in the range of 30% after sintering and reduction.

A-layer: The suspension comprised scandia yttria stabilized zirconia (SYSZ) and about 60 vol % NiO powder. The green thickness of the tape-cast layer was about 25 μm. The porosity of this layer was about 25% after sintering and reduction.

E-layer: The suspension comprised scandia yttria stabilized zirconia (SYSZ) the green thickness of the tape-cast layer was about 15 μm.

In the second step, the tapes were laminated in the order of AS-IS-A-E by employing heated rolls in a double roll set-up. The temperature was about 140° C. and the pressure was about 1 bar.

In the fourth step, the laminated tapes were cut into the desired shapes. This was done by knife punching resulting in areas of 12×12 cm² after sintering.

In the fifth step, the half-cell was sintered. The half-cell was placed in a furnace and sintered at about 1300° C. and left for about 12 hours before cooling to room temperature.

In the sixth step, a cathode was deposited on the sintered half-cell by screen printing an ink comprising a 1:1 weight ratio mixture of $La_{0.75}Sr_{0.25}MnO_{3-\delta}$ and SYSZ on the surface of the electrolyte layer (E). The thickness of the printed layer was 30 μm before sintering.

The seventh step was the sintering of the cell in a furnace at about 1100° C. for 2 hours before cooling to room temperature.

Example 2

Incl. a Mobilization Agent in the Electrolyte and the Anode

A solid oxide fuel cell with an impurity sink layer between the anode and the anode support and with $K_2O$ added to the electrolyte and anode slurries as a mobilization agent was obtained. This multilayer structure is illustrated in FIG. 4.

The first step was the manufacture of four tapes: an anode support tape (AS), an impurity sink tape (IS), an anode tape (A) and an electrolyte tape (E). Suspensions for tape-casting were manufactured and cast as described in Example 1.

AS-layer. The suspension comprised 45 vol % yttria stabilized zirconia (YSZ) and about 55 vol % NiO powder. The green thickness of the tape-cast layer was in the range of 400 μm. The porosity of this layer was in the range of 30% after sintering and reduction.

IS-layer. The suspension comprised 15 vol % porous $CaZrO_3$ particles (mean particle size is below 6 micrometer with an average pore size of 60 nm), 30 vol % yttria stabilized zirconia (YSZ) and about 55 vol % NiO powder. The green thickness of the tape-cast layer was in the range of 30 μm. The porosity of this layer was in the range of 30% after sintering and reduction.

A-layer: The suspension comprised 40 vol % scandia yttria stabilized zirconia (SYSZ) about 60 vol % NiO powder and 0.1 vol % $K_2O$. The green thickness of the tape-cast layer was about 25 μm. The porosity of this layer was about 25% after sintering and reduction.

E-layer: The suspension comprised scandia yttria stabilized zirconia (SYSZ) and 0.05 vol % $K_2O$. The green thickness of the tape-cast layer was about 15 μm.

In the second step the tapes were laminated in the order of AS-IS-A-E by employing heated rolls in a double roll set-up. The temperature was about 140° C. and the pressure was about 1 bar.

In the fourth step, the laminated tapes were cut into the desired shapes. This was done by knife punching resulting in areas of 12×12 cm² after sintering.

In the fifth step, the half-cell was sintered. The half-cell was placed in a furnace and sintered at about 1300° C. and left for about 8 hours before cooling to room temperature.

In the sixth step, a cathode was deposited on the sintered half-cell by screen printing an ink comprising a 1:1 weight ratio mixture of $La_{0.75}Sr_{0.25}MnO_{3-\delta}$ and SYSZ on the surface of the electrolyte layer (E). The thickness of the printed layer was 30 μm before sintering.

The seventh step was the sintering of the cell in a furnace at about 1100° C. for 2 hours before cooling to room temperature.

Example 3

Including a Ceria Barrier Layer

A solid oxide fuel cell with an impurity sink layer between the anode and the anode support and with $K_2O$ added to the electrolyte and anode slurries as mobilization agent was obtained.

The first step was the manufacture of four tapes: an anode support tape (AS), an impurity sink tape (IS), an anode tape (A) and an electrolyte tape (E). Suspensions for tape-casting were manufactured and cast as described in Example 1.

AS-layer: The suspension comprised 45 vol % yttria stabilized zirconia (YSZ) and about 55 vol % NiO powder. The green thickness of the tape-cast layer was in the range of 400 μm. The porosity of this layer was in the range of 30% after sintering and reduction.

IS-layer. The suspension comprised 15 vol % porous $CaZrO_3$ particles (mean particle size is around 6 micrometer with an average pore size of 60 nm), 30 vol % yttria stabilized zirconia (YSZ) and about 55 vol % NiO powder. The green thickness of the tape-cast layer was in the range of 30 μm. The porosity of this layer was in the range of 30% after sintering and reduction.

A-layer: The suspension comprised 40 vol % scandia yttria stabilized zirconia (SYSZ) about 60 vol % NiO powder and 0.1 vol % $K_2O$. The green thickness of the tape-cast layer was about 25 μm. The porosity of this layer was about 25% after sintering and reduction.

E-layer: The suspension comprised scandia yttria stabilized zirconia (SYSZ) and 0.05 vol % $K_2O$. The green thickness of the tape-cast layer was about 15 μm.

In the second step the tapes were laminated in the order of AS-IS-A-E by employing heated rolls in a double roll set-up. The temperature was about 140° C. and the pressure was about 1 bar.

In the third step, a barrier layer was deposited on the electrolyte side of the laminated tapes by spray painting a suspension of CGO. The thickness of the spray painted layer was 3 μm before sintering.

In the fourth step, the laminated and spray painted tapes were cut into the desired shapes. This was done by knife punching resulting in areas of 12×12 cm² after sintering.

In the fifth step, the half-cell was sintered. The half-cell was placed in a furnace and sintered at about 1300° C. and left for about 8 hours before cooling to room temperature.

In the sixth step, a cathode was deposited on the sintered half-cell by screen printing an ink comprising a 1:1 weight ratio mixture of $La_{0.6}Sr_{0.4}Fe_{0.8}CO_{0.2}O_{3-\delta}$ and CGO on the surface of the electrolyte layer (E). The thickness of the printed layer was 30 μm before sintering.

The seventh step was the sintering of the cell in a furnace at about 900° C. for 2 hours before cooling to room temperature.

Example 4

A cell was manufactured as outlined above for Example 2, but the $K_2O$ addition to the electrolyte layer was omitted.

Example 5

Mobilization by $H_2O$

A cell was manufactured as outlined above for Example 2 for steps one to four, but without the $K_2O$ addition to the anode and electrolyte layer.

In the fifth step, the half-cell was sintered. The half-cell was placed in a furnace and sintered at about 1350° C. in an atmosphere containing air with 25% $H_2O$. The dwell time at max. temperature was about 9 hours before cooling to room temperature.

In the sixth step, a cathode was deposited on the sintered half-cell by screen printing an ink comprising a 1:1 weight ratio mixture of $La_{0.75}Sr_{0.25}MnO_{3-\delta}$ and $Ce_{0.9}Gd_{0.1}O_{2-\delta}$, CGO, on the surface of the electrolyte layer (E). The thickness of the printed layer was 30 μm before sintering.

The seventh step was the sintering of the cell in a furnace at about 1100° C. for 2 hours before cooling to room temperature so as to obtain the final cell.

Example 6

A solid oxide fuel cell with an impurity sink layer between the anode and the anode support was obtained. Furthermore, a SYSZ cathode precursor layer and an impurity sink layer were added on top of the electrolyte layer. $Na_2O$ was added to the slurries for cathode precursor layer, electrolyte and anode layers as mobilization agent. This structure is illustrated in FIG. 6.

The first step was the manufacture of six tapes: an anode support tape (AS), an anode impurity sink tape (AIS), an anode tape (A), an electrolyte tape (E), a cathode precursor tape (CP) and a cathode impurity sink tape (CIS). Suspensions for tape-casting were manufactured and cast as described in Example 1.

AS-layer: The suspension comprised 45 vol % yttria stabilized zirconia (YSZ) and about 55 vol % NiO powder. The green thickness of the tape-cast layer was in the range of 400 μm. The porosity of this layer was in the range of 30% after sintering and reduction.

AIS-layer: The suspension comprised 15 vol % porous $CaZrO_3$ particles (mean particle size was around 6 micrometer with an average pore size of 40 nm), 30 vol % yttria stabilized zirconia (YSZ) and about 55 vol % NiO powder. The green thickness of the tape-cast layer was in the range of 30 μm. The porosity of this layer was in the range of 30% after sintering and reduction.

A-layer: The suspension comprised 40 vol % scandia yttria stabilized zirconia (SYSZ) about 60 vol % NiO powder and 0.1 vol % $Na_2O$. The green thickness of the tape-cast layer was about 25 μm. The porosity of this layer was about 25% after sintering and reduction.

E-layer: The suspension comprised scandia yttria stabilized zirconia (SYSZ) and 0.05 vol % $Na_2O$. The green thickness of the tape-cast layer was about 15 μm.

CP-layer: The suspension comprised scandia yttria stabilized zirconia (SYSZ) and 0.1 vol % $Na_2O$. The green thickness of the tape-cast layer was about 25 μm. The porosity of this layer was in the range of 40% after sintering and reduction.

CIS-layer: The suspension comprised 20 vol % porous $CaZrO_3$ particles (mean particle size was around 6 micrometer with an average pore size of 60 nm) and 80 vol % yttria stabilized zirconia (YSZ). The green thickness of the tape-cast layer was in the range of 25 μm. The porosity of this layer was in the range of 40% after sintering and reduction.

In the second step the tapes were laminated in the order of AS-AIS-A-E-CP-CIS by employing heated rolls in a double roll set-up. The temperature was about 140° C. and the pressure was about 1 bar.

In the fourth step, the laminated tapes were cut into the desired shapes. This was done by knife punching resulting in areas of 12×12 $cm^2$ after sintering.

In the fifth step, the half-cell was sintered. The half-cell was placed in a furnace and sintered at about 1300° C. and left for about 12 hours before cooling to room temperature.

The sixth step is the impregnation of the cathode. A nitrate solution of La, Sr, and Mn is vacuum infiltrated into the porous structures (CP and CIS). The infiltration is performed six times with an intermediate heating step for decomposition of the nitrates. The resulting composition of the impregnated perovskite cathode was: $(La_{0.75}Sr_{0.25})_{0.95}MnO_{3-\delta}$.

Example 7

A cell was obtained as outlined in Example 6 except that in step 2, screen printing was employed instead of tape casting.

Example 8

A symmetrical solid oxide fuel cell comprising five layers was obtained: an impurity sink layer (IS)—an electrode precursor layer (EP)—an electrolyte layer (E)—an electrode impregnation layer (EP)—an impurity sink layer (IS). $B_2O_3$ was added to the electrode precursor slurries, and $K_2O$ was added to the electrolyte slurry as mobilization agents. The cell of this example is illustrated in FIG. 7.

The first step was the manufacture of three tapes: an impurity sink tape (IS), an electrode precursor tape (EP) and an electrolyte tape (E). Suspensions for tape-casting were manufactured and cast as described in Example 1.

IS-layer: The suspension comprised 25 vol % porous $SrZrO_3$ particles (mean particle size is around 6 micrometer with an average pore size of 60 nm), 75 vol % magnesia stabilized zirconia (MgSZ). The green thickness of the tape-cast layer was in the range of 30 μm. The porosity of this layer was in the range of 40% after sintering and reduction.

EP-layer: The suspension comprised scandia yttria stabilized zirconia (SYSZ) and 0.05 vol % $B_2O_3$. The green thickness of the tape-cast layer was about 25 μm. The porosity of this layer was in the range of 35% after sintering and reduction.

E-layer: The suspension comprised scandia yttria stabilized zirconia (SYSZ) and 0.05 vol % $K_2O$. The green thickness of the tape-cast layer was about 15 μm.

In the second step the tapes were laminated in the order of IS-EP-E-EP-IS by employing heated rolls in a double roll set-up. The temperature was about 140° C. and the pressure was about 1 bar.

In the fourth step, the laminated tapes were cut into the desired shapes. This was done by knife punching resulting in areas of 12×12 $cm^2$ after sintering.

In the fifth step, the half-cell was sintered. The symmetrical cell was placed in a furnace and sintered at about 1250° C. and left for about 12 hours before cooling to room temperature.

The sixth step was the impregnation of the cathode. A nitrate solution of La, Sr, and Mn was vacuum infiltrated into the porous structure. The infiltration was performed four times with an intermediate heating step for decomposition of the nitrates. The resulting composition of the impregnated perovskite cathode was: $(La_{0.75}Sr_{0.25})_{0.95}MnO_{3-\delta}$.

The seventh step was the impregnation of the anode. A nitrate solution of Ni was vacuum infiltrated into the porous structure on the opposite side of the cathode. The infiltration was performed seven times with an intermediate heating step for decomposition of the nitrates.

Example 9

A solid oxide fuel cell with an impurity sink layer between the anode and the anode support was manufactured. The cell obtained in this example is illustrated in FIG. 5.

The first step was the manufacture of slurries: an anode support (AS), an impurity sink (IS), an anode (A) and an electrolyte (E). Suspensions were manufactured by means of ball milling of powders with polyvinyl pyrrolidone (PVP), polyvinyl butyral (PVB) and EtOH+MEK as additives. After control of particle size, the AS suspensions was tape cast and after drying the IS, A and E slurries were spray painted onto the anode support layer with intermediate drying.

AS-layer: The suspension comprised 45 vol % yttria stabilized zirconia (YSZ) and about 55 vol % NiO powder. The green thickness of the tape-cast layer was in the range of 400 μm. The porosity of this layer was in the range of 30% after sintering and reduction.

IS-layer: The suspension comprised 20 vol % porous $SrZrO_3$ particles (mean particle size is around 4 micrometer with an average pore size of 40 nm), 25 vol % yttria stabilized zirconia (YSZ) and about 55 vol % NiO powder. The green thickness of spray painted layer was in the range of 25 μm. The porosity of this layer was in the range of 30% after sintering and reduction.

A-layer: The suspension comprised scandia yttria stabilized zirconia (SYSZ) and about 60 vol % NiO powder. The green thickness of the spray painted layer was about 25 μm. The porosity of this layer was about 25% after sintering and reduction.

E-layer: The suspension comprised scandia yttria stabilized zirconia (SYSZ) the green thickness of spray painted layer was about 15 μm.

In the third step, the spray painted tapes were cut into the desired shapes. This was done by knife punching resulting in areas of 12×12 $cm^2$ after sintering.

In the fourth step, the half-cell was sintered. The half-cell was placed in a furnace and sintered at about 1300° C. and left for about 12 hours before cooling to room temperature.

In the fifth step, a cathode was deposited on the sintered half-cell by screen printing an ink comprising a 1:1 weight ratio mixture of $La_{0.75}Sr_{0.25}MnO_{3-\delta}$ and SYSZ on the surface of the electrolyte layer (E). The thickness of the printed layer was 30 µm before sintering.

The sixth step was the sintering of the cell in a furnace at about 1100° C. for 2 hours before cooling to room temperature.

Example 10

A cell was obtained as outlined in Example 6, but an anode support (AS) layer was laminated on one side of the symmetric structure, as illustrated in FIG. 7.

Example 11

A cell was obtained as outlined in Example 6 for steps one to four, but with a metal support layer (e.g. based on a FeCr alloy) laminated on one side of the symmetric structure, as illustrated in FIG. 7.

In the fifth step, the half-cell was sintered. The cell was placed in a furnace and sintered at about 1250° C. under reducing conditions and left for about 6 hours before cooling to room temperature.

The cell was completed as described in Example 6.

Example 12

A cell was obtained as outlined in Example 1, but the IS layer was omitted and Mg-stabilized zirconia was substituted for YSZ in the AS layer.

Example 13

A cell was obtained as outlined in Example 1, but the IS layer was omitted and Ca-stabilized zirconia was substituted for YSZ in the AS layer.

Example 14

A cell was obtained as outlined in Example 3, and agglomerated particles were added to the A-layer.

Example 15

A cell was obtained as outlined in Example 6, and agglomerated particles were added to the electrode precursor layers.

Example 16

A gas separation device suitable for use for separation of oxygen from air and supply of oxygen to some chemical processes (eg. oxidation of $CH_4$) was manufactured through the following steps:
1) Manufacture of a support tube structure of MgO;
2) Application of a very thin catalyst layer ~2 µm by wet spraying of a slurry, containing suitable catalyst particles (containing Ni or Rh and MgO or $Al_2O_3$) and IS-particles of the type described in Example 9;
3) Application of a membrane layer of $La_{0.6}Sr_{0.4}Fe_{0.8}Ga_{0.2}O_3$ by dip-coating the tube in a stable suspension containing particles of suitable size of the membrane material;
4) Firing of the tube to densify the membrane at 1250° C. for 4 hours;
5) Application of a catalyst layer on the outside of the tube by wet spraying a suspension of a suitable catalyst $La_{0.6}Sr_{0.4}Fe_{0.6}Co_{0.4}O_3$ where 20 wt % IS-particles of the type specified in Example 6 were added to the slurry.

Example 17

A gas separation device suitable for use for separation of oxygen from air and supply of oxygen to some chemical processes (e.g. oxidation of $CH_4$) was manufactured through the following steps:
1) Manufacture of a support plate by tape casting of a support tape of Mg stabilized zirconia (as outlined in Example 1). Suspensions for tape casting were made by ball milling of powders with PVP, PVB and EtOH and MEK as additives. The tape thickness was about 500 µm;
2) Manufacture of a thin catalyst layer tape ~15 µm, by tape casting a slurry containing suitable catalyst particles (containing Ni or Rh), Mg stabilized zirconia and IS-particles of the type as described in Example 9;
3) Manufacture of a membrane tape of $Ce_{0.8}Gd_{0.2}O_2$ with a thickness of 25 µm;
4) Lamination of the three tapes described above as outlined in Example 1, using rolls heated to 140° C.;
5) Punching of pieces in desired size by a punch knife;
6) Firing of the piece to densify the membrane at 1300° C. for 4 hours;
7) Application of a catalyst layer by screen printing of a suspension of a suitable catalyst $La_{0.6}Sr_{0.4}CoO_3$ where 20 vol % IS-particles of the type specified in example 6 are added to the slurry;
8) Firing of the cathode layer at about 1100° C. for 4 h and subsequently exposure to a moist gas (20% $H_2O$) at about 1000° C. for 12 hours.

Example 18

A device for extraction of hydrogen form a syngas mixture was obtained by the following steps
1) Manufacture of an "impregnation layer tape" containing precalcined $SrCe_{0.95}Yb_{0.05}O_3$, a pore former (20 vol % graphite), and 20 vol % IS-particles of the type as specified in Example 6. The green thickness was about 50 µm;
2) Manufacture of a membrane tape of 20 µm $SrCe_{0.95}Yb_{0.05}O_3$;
3) Lamination of a sandwich of three tapes—two impregnation layer tapes sandwiched around the membrane tape;
5) Cutting to the desired size by a punch knife;
6) Firing at about 1300° C. for 4 hours;
7) Impregnation of catalyst particles into the impregnation layers using vacuum infiltration of colloidal Pd or Pt suspensions; the impregnation was repeated 6 times with intermediate heating; and
8) Heat treatment of the device at about 950° C.

The invention claimed is:

1. A solid oxide cell comprising a support layer, an anode layer, an electrolyte layer, and a cathode layer,
   wherein the cell further comprises an impurity sink layer between the support layer and the anode layer or on top of the cathode layer, or combinations thereof,
   wherein the impurity sink layer comprises an electrolyte material selected from the group consisting of doped zirconia, doped ceria, doped gallates and proton conducting electrolytes,
   wherein the impurity sink layer comprises agglomerated particles selected from the group consisting of MgO, CaO, $CaZrO_3$, $SrZrO_3$, $BaZrO_3$, and mixtures thereof in an amount of from 1 to 50 vol %, based on the total volume of the respective composition forming the impurity sink layer, and wherein the agglomerated particles have a particle size in the range of 0.5 to 10 μm, and a pore diameter between 10 nm and 0.5 μm.

2. A method for producing the solid oxide cell of claim 1, comprising the steps of:
- A) providing the support layer;
- B) optionally applying a first impurity sink layer on the support layer;
- C) applying the anode layer on either the support layer or the optional first impurity sink layer;
- D) applying the electrolyte layer on top of the anode layer;
- E) applying the cathode layer on top of the electrolyte layer; and
- F) optionally applying a second impurity sink layer on top of the cathode layer; and
- G) sintering the obtained structure, wherein the method comprises performing at least one of steps B) or F), and the first and second impurity sink layers each comprise:

an electrolyte material selected from the group consisting of doped zirconia, doped ceria, doped gallates and proton conducting electrolytes; and agglomerated particles selected from the group consisting of MgO, CaO, $CaZrO_3$, $SrZrO_3$, $BaZrO_3$, and mixtures thereof in an amount of from 1 to 50 vol %, based on the total volume of the respective composition forming the impurity sink layer, the agglomerated particles having a particle size in the range of 0.5 to 10 μm, and a pore diameter between 10 nm and 0.5 μm.

3. The method of claim 2, wherein step G) is carried out at a temperature of 900 to 1300° C.

4. The method of claim 2, wherein step G) is carried out in an atmosphere having a relative humidity of at least 30%.

5. The method of claim 2, wherein step G) is carried out in an atmosphere having a relative humidity of at least 50%.

* * * * *